United States Patent
Le et al.

(10) Patent No.: US 11,794,717 B2
(45) Date of Patent: Oct. 24, 2023

(54) POWER MANAGEMENT FOR HYBRID ELECTRIC VEHICLES

(71) Applicant: Cummins Inc., Columbus, IN (US)

(72) Inventors: Dat Duc Le, Columbus, IN (US); Carlos A. Lana, Columbus, IN (US); Kenneth M. Follen, Greenwood, IN (US)

(73) Assignee: CUMMINS INC., Columbus, IN (US)

( * ) Notice: Subject to any disclaimer, the term of this patent is extended or adjusted under 35 U.S.C. 154(b) by 215 days.

(21) Appl. No.: 17/246,678

(22) Filed: May 2, 2021

(65) Prior Publication Data
US 2022/0348185 A1 Nov. 3, 2022

(51) Int. Cl.
| | | |
|---|---|---|
| *B60W 20/13* | (2016.01) | |
| *B60K 6/26* | (2007.10) | |
| *B60K 6/28* | (2007.10) | |
| *B60K 6/46* | (2007.10) | |
| *G07C 5/04* | (2006.01) | |
| *B60W 10/06* | (2006.01) | |
| *B60W 10/08* | (2006.01) | |
| *B60K 6/24* | (2007.10) | |

(Continued)

(52) U.S. Cl.
CPC ............... *B60W 20/13* (2016.01); *B60K 6/24* (2013.01); *B60K 6/26* (2013.01); *B60K 6/28* (2013.01); *B60K 6/46* (2013.01); *B60W 10/06* (2013.01); *B60W 10/08* (2013.01); *B60W 20/11* (2016.01); *B60W 20/12* (2016.01); *G07C 5/04* (2013.01); *B60W 2510/068* (2013.01); *B60W 2510/0619* (2013.01); *B60W 2510/0666* (2013.01); *B60W 2510/0676* (2013.01); *B60W 2510/244* (2013.01); *B60W 2520/10* (2013.01); *B60W 2530/209* (2020.02); *B60W 2540/10* (2013.01); *B60W 2555/20* (2020.02); *B60W 2710/06* (2013.01); *B60W 2710/08* (2013.01); *B60Y 2200/92* (2013.01); *B60Y 2300/91* (2013.01)

(58) Field of Classification Search
CPC ...... B60W 20/13; B60W 10/06; B60W 10/08; B60W 20/11; B60W 20/12; B60W 20/16; B60K 6/24; B60K 6/26; B60K 6/28; B60K 6/46
USPC .................................................. 701/112, 22
See application file for complete search history.

(56) References Cited

U.S. PATENT DOCUMENTS

| | | | | |
|---|---|---|---|---|
| 5,892,346 A | * | 4/1999 | Moroto ................. | B60W 20/12 318/587 |
| 6,427,793 B1 | * | 8/2002 | Hanada ................. | B60W 10/06 903/910 |
| 6,484,830 B1 | | 11/2002 | Gruenwald et al. | |

(Continued)

*Primary Examiner* — Sizo B Vilakazi
*Assistant Examiner* — Brian R Kirby
(74) *Attorney, Agent, or Firm* — Faegre Drinker Biddle & Reath LLP

(57) ABSTRACT

A system and method for power management of hybrid electric vehicles is provided. In some implementations, a plug-in series hybrid electric vehicle may include an engine, a motor/generator (MG), a traction motor, an energy storage device, and a controller. The controller is coupled to the engine and the MG to control operation of the engine and the MG such that a state-of-charge (SOC) of the energy storage device tracks a dynamic reference SOC profile during a trip and an average engine power (AEP) is maintained above a threshold. In some instances, maintaining AEP above a threshold supports emission control of the vehicle.

28 Claims, 5 Drawing Sheets

(51) Int. Cl.
*B60W 20/11* (2016.01)
*B60W 20/12* (2016.01)

(56) References Cited

U.S. PATENT DOCUMENTS

| | | | | |
|---|---|---|---|---|
| 7,539,562 | B2* | 5/2009 | Maguire | G05D 1/0217 |
| | | | | 701/123 |
| 8,565,952 | B2 | 10/2013 | Mehr | |
| 8,731,752 | B2* | 5/2014 | Yu | B60W 20/13 |
| | | | | 180/65.265 |
| 8,774,993 | B2* | 7/2014 | Harada | F01N 3/2006 |
| | | | | 60/272 |
| 8,825,249 | B2 | 9/2014 | Ohno | |
| 9,266,524 | B2 | 2/2016 | Lutz | |
| 9,285,432 | B2 | 3/2016 | Schwarz | |
| 10,471,950 | B2* | 11/2019 | Kim | B60W 10/08 |
| 10,800,402 | B2* | 10/2020 | Park | B60W 20/16 |
| 2007/0208467 | A1* | 9/2007 | Maguire | B60W 10/08 |
| | | | | 701/1 |
| 2009/0259363 | A1* | 10/2009 | Li | B60W 50/0097 |
| | | | | 180/65.265 |
| 2010/0138142 | A1* | 6/2010 | Pease | B60W 50/0097 |
| | | | | 701/123 |
| 2010/0161166 | A1* | 6/2010 | Yamada | G16Z 99/00 |
| | | | | 180/65.265 |
| 2010/0280687 | A1* | 11/2010 | Tate, Jr. | B60W 10/26 |
| | | | | 903/903 |
| 2011/0246010 | A1* | 10/2011 | de la Torre Bueno | B60L 50/61 |
| | | | | 903/902 |
| 2012/0035795 | A1* | 2/2012 | Yu | B60W 50/0097 |
| | | | | 180/65.265 |
| 2013/0006462 | A1* | 1/2013 | Fleckner | B60W 20/00 |
| | | | | 903/903 |
| 2014/0074386 | A1* | 3/2014 | McGee | B60W 50/0097 |
| | | | | 903/902 |
| 2014/0163789 | A1* | 6/2014 | Yu | B60W 20/00 |
| | | | | 903/930 |
| 2014/0288743 | A1* | 9/2014 | Hokoi | B60W 10/26 |
| | | | | 180/65.265 |
| 2015/0275787 | A1* | 10/2015 | Dufford | B60W 10/08 |
| | | | | 701/112 |
| 2015/0314775 | A1* | 11/2015 | Dextreit | B60W 10/08 |
| | | | | 180/65.265 |
| 2016/0297424 | A1* | 10/2016 | Park | B60W 50/0097 |
| 2016/0325729 | A1* | 11/2016 | Askerdal | B60W 10/30 |
| 2017/0130635 | A1* | 5/2017 | Smith | B60K 6/24 |
| 2019/0161070 | A1* | 5/2019 | Kamatani | F01N 9/00 |
| 2019/0176802 | A1* | 6/2019 | Kim | B60W 20/00 |
| 2019/0299968 | A1* | 10/2019 | Morita | B60W 20/20 |
| 2020/0079223 | A1* | 3/2020 | Puri | B60L 58/13 |
| 2020/0094812 | A1* | 3/2020 | Kurihashi | B60K 6/28 |

* cited by examiner

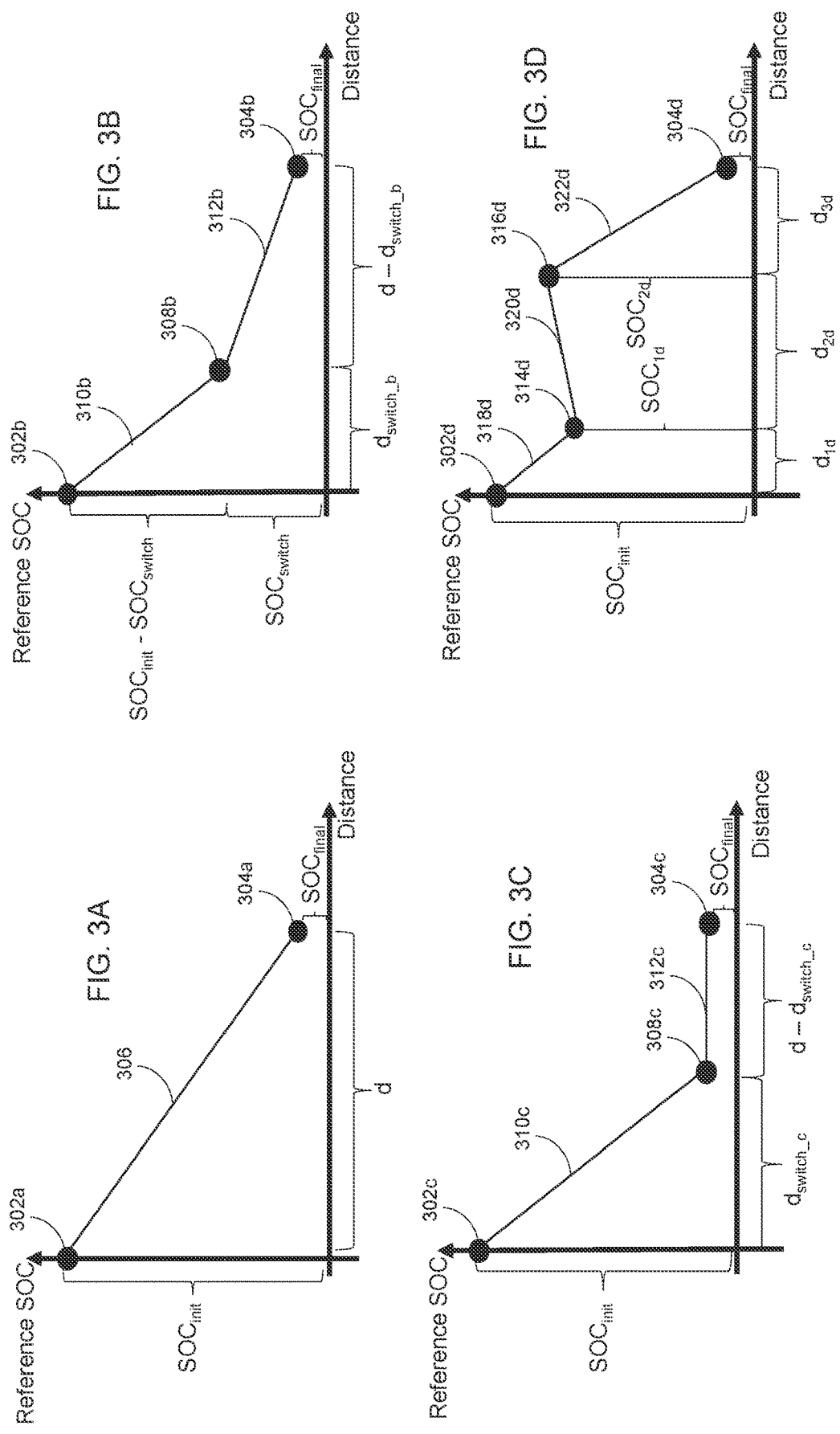

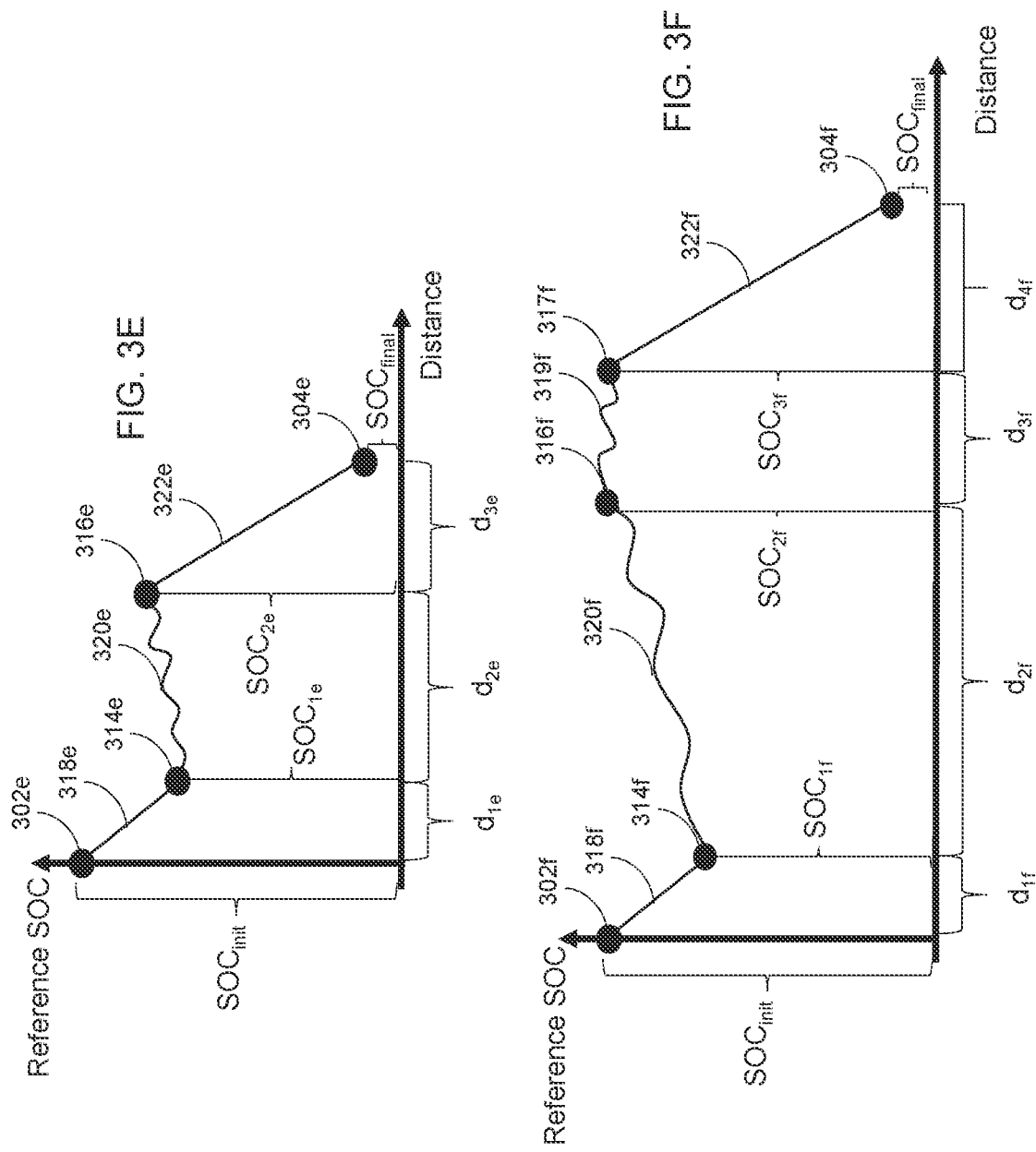

POWER MANAGEMENT FOR HYBRID ELECTRIC VEHICLES

GOVERNMENT SUPPORT CLAUSE

This invention was made with Government support under Award Number(s) DE-AC02-06CH11357 awarded by the Department of Energy. The Government has certain rights in this invention.

FIELD OF THE DISCLOSURE

The present disclosure generally relates to hybrid vehicles. More specifically, the present disclosure relates to managing a battery state-of-charge (SOC) and average engine power (AEP) of a plug-in series hybrid electric vehicle through dynamic SOC referencing for better emission control.

BACKGROUND OF THE DISCLOSURE

Recently, there has been an increased demand for vehicles with hybrid powertrains, i.e., hybrid vehicles with multiple forms of motive power, to meet criteria such as improved fuel economy and reduced emissions, all the while maintaining optimal performance for the user. Such hybrid vehicles, equipped with a powertrain including a motor/generator (MG) and an engine, generally include controls for determining from which of the available onboard power sources to supply power to the powertrain. For example, the controls may choose the battery and/or the engine to be the power source for the powertrain, and the controls may choose the amount of energy to be provided from each source of energy. These controls may use a target or reference state-of-charge (SOC) profile for the battery to govern this power split (including starting and ending SOC, and trajectory) as well as targets or decisions on how and when the engine is operated. The references used for the powertrain can have a significant impact on factors such as fuel economy, performance, emissions, and component life.

However, the controls as presently known in the art use a single calibration or a set of references as chosen globally for many or all use cases for a given vehicle. That is, the control is preset with a set of predetermined rules that are used for the control to determine which of the power sources to use to obtain energy, and how much energy is to be obtained from each power source. Because there are many different elements that affect the aforementioned factors of the vehicle, it is difficult for the control to arrive at a decision that is optimal with respect to all of: fuel economy, performance, emissions, and component life under different scenarios, such as different drive cycles or ambient conditions.

In view of the above, there is a need for a control system that can more flexibly and dynamically control the hybrid powertrains in hybrid vehicles such that operation of the electric motor and the engine is controlled in a way that optimizes fuel economy, performance, emissions, and component life of the hybrid vehicle.

SUMMARY OF THE DISCLOSURE

In one embodiment, the present disclosure provides a plug-in series hybrid electric vehicle comprising an engine, a motor/generator (MG) coupled to the engine, a traction motor coupled to the MG and configured to propel the vehicle, an energy storage device coupled to the MG, and a controller coupled to the engine and the MG to control operation of the engine and the MG such that a state-of-charge (SOC) of the energy storage device tracks a dynamic reference SOC profile during a trip and an average engine power (AEP) is maintained above a threshold.

In one aspect of this embodiment, the dynamic reference SOC profile comprises a segment comprising a blended mode. In another aspect of this embodiment, the dynamic reference SOC profile comprises one or more segments comprising a blended mode and a pure EV mode. In yet another aspect, the dynamic reference SOC profile comprises one or more segments comprising a pure EV mode and a charge sustaining mode. In yet another aspect, the dynamic reference SOC profile comprises one or more segments comprising a pure EV mode and a battery recharging mode. In yet another aspect, the dynamic reference SOC profile comprises one or more segments comprising a pure EV mode, a battery recharging mode, and a battery sustaining mode. In yet another aspect, the dynamic reference SOC profile comprises one or more segments comprising a pure EV mode, a battery recharging mode, and a blended mode.

In one aspect of this embodiment, the engine is spark ignited and the energy storage device is a high voltage battery. In another aspect, the SOC of the energy storage device is a minimum allowable SOC at the end of the trip. In another aspect, the threshold is determined using at least one of vehicle speed, wind speed, ambient air temperature, and aftertreatment temperatures.

In yet another aspect, the controller comprises an electric vehicle (EV) enabler configured to enable or disable pure electric mode, a battery management system (BMS) configured to measure the SOC of the energy storage device, and a dynamic SOC reference (DSR) module configured to generate SOC reference dynamically.

In a variant of this aspect, the controller, including the EV enabler, is configured to calculate EV range based on energy per mile (EPM) estimation, vehicle position in real time, trip distance, and look-ahead information. In one aspect of this embodiment, the look-ahead information comprises traffic, speed, fleet information, and weather.

In a variant of this aspect, the controller comprises a frequency counter configured to calculate a start/stop frequency of an engine, and an engine power module configured to calculate engine power limits.

In a variant of this aspect, the controller is configured to receive the start/stop frequency and to update a start/stop counter to maintain a number of engine start/stops within a threshold value. In one aspect of this embodiment, the engine power limits are based on at least one of a driver demand power, traction motor efficiency, inverters efficiency, and battery power limits. In another aspect, the engine power module comprises one or more sensors to detect at least one of a catalyst temperature, a turbine outlet temperature, vehicle speed, ambient temperature, battery internal resistance, battery open circuit voltage, battery full energy, engine coolant temperature, air-fuel ratio.

In one embodiment, the present disclosure provides a method for controlling a plug-in series hybrid electric vehicle. The method comprises controlling operation of a powertrain during a trip such that a state-of-charge (SOC) of an energy storage device tracks a dynamic SOC reference profile, and controlling operation of the powertrain to maintain an average engine power (AEP) above a threshold during operation of the engine. In one aspect of this embodiment, the threshold is determined using at least one of vehicle speed, wind speed, ambient air temperature, and aftertreatment temperatures.

In one aspect of this embodiment, the dynamic reference SOC profile comprises a segment comprising a blended mode. In another aspect of this embodiment, the dynamic reference SOC profile comprises one or more segments comprising a blended mode and a pure EV mode. In yet another aspect, the dynamic reference SOC profile comprises one or more segments comprising a pure EV mode and a charge sustaining mode. In yet another aspect, the dynamic reference SOC profile comprises one or more segments comprising a pure EV mode and a battery recharging mode. In yet another aspect, the dynamic reference SOC profile comprises one or more segments comprising a pure EV mode, a battery recharging mode, and a battery sustaining mode. In yet another aspect, the dynamic reference SOC profile comprises one or more segments comprising a pure EV mode, a battery recharging mode, and a blended mode.

In one aspect of this embodiment, the method further includes estimating a total energy required from the engine for a trip. In a variant of this aspect, estimating a total energy required from the engine includes determining a duration of the trip and estimating an energy per mile (EPM) for a vehicle during the trip.

In another aspect, the method further includes dynamically generating a reference SOC of the energy storage device. In another aspect, the SOC of the energy storage device is a minimum allowable SOC at the end of the trip.

In one aspect of this embodiment, the method further includes calculating start/stop frequency, and updating a start/stop counter to maintain a number of engine start/stops within a threshold value.

In another aspect, the method further includes calculating engine power limits. In a variant of this aspect, the engine power limits are calculated based on at least one of a driver demand power, traction motor efficiency, inverters efficiency, and battery limits.

In one embodiment, the present disclosure provides a power management system for a plug-in series hybrid electric vehicle. The power management system comprises a controller/processor including a memory, wherein the memory includes instructions, wherein the controller/processor is configured to execute the instructions to control operation of a motor/generator (MG) powered by an energy storage device during a trip such that a state-of-charge (SOC) of the energy storage device tracks a dynamic SOC reference profile, and wherein the controller/processor is configured to execute the instructions to control operation of an engine to maintain an average engine power (AEP) above a threshold during operation of the engine.

In one aspect of this embodiment, a length of the trip is known at a beginning of the trip.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIGS. 3A-3F show diagrams of dynamic reference SOC profiles of an energy storage device generated by a dynamic SOC reference (DSR) module under different scenarios as a vehicle travels a certain distance, according to certain embodiments of the present disclosure.

Figure 1:
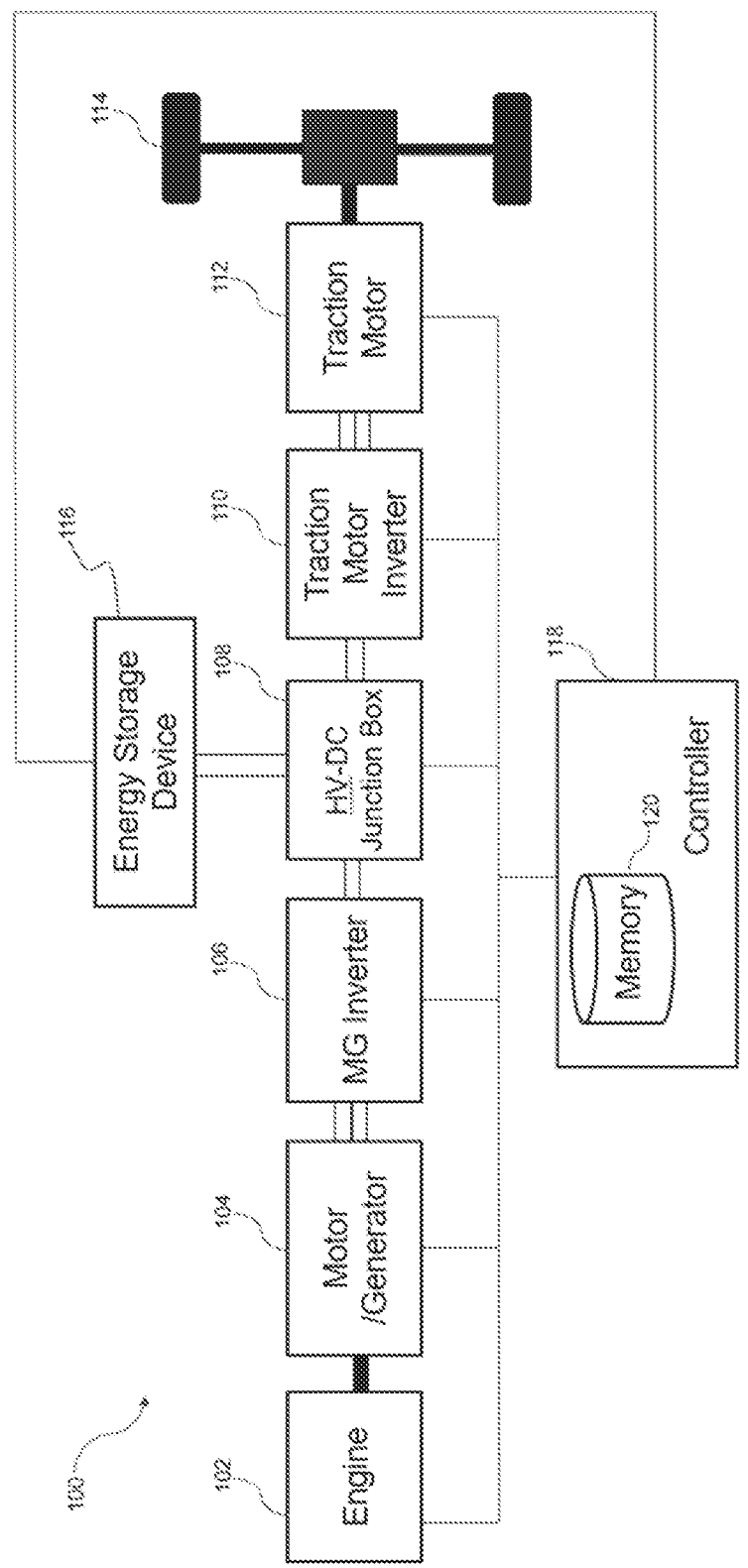
FIG. 1 is a block diagram of an example of a powertrain for a plug-in series hybrid vehicle (not shown), according to certain embodiments of the present disclosure.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, when an element, component, device or layer is described as being "on" "connected to," "coupled to" or "in contact with" another element, component, device or layer, it can be directly on, directly connected to, directly coupled with, in direct contact with, or intervening elements, components, devices or layers may be on, connected, coupled or in contact with the particular element, component or layer, for example. When an element, component, device or layer for example is referred to as being "directly on," "directly connected to," "directly coupled to," or "directly in contact with" another element, component, device or layer, there are no intervening elements, components, devices or layers for example.

Although illustrative methods may be represented by one or more drawings (e.g., flow diagrams, communication flows, etc.), the drawings should not be interpreted as implying any requirement of, or specific order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," "series" or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a specific piece of information may additionally, or alternatively, base the same determination on another piece of information.

FIG. 1 is a block diagram of an example of a powertrain 100 for a plug-in series hybrid vehicle (not shown), according to certain embodiments of the present disclosure. As shown, the powertrain 100 includes an engine 102, a motor/generator (MG) 104 mechanically connected to the engine 102, a MG inverter 106 electrically connected to the MG 104, a high voltage direct current (HV-DC) junction box 108 electrically connected to the MG inverter 106, a traction motor inverter 110 electrically connected to the HV-DC junction box 108, a traction motor 112 electrically connected to the traction motor inverter 110, and wheels 114 of the hybrid vehicle mechanically connected to the traction motor 112. The HV-DC junction box 108 is electrically connected to an energy storage device 116, and the energy storage device 116 is connected to a controller 118 including a memory 120. The number of controllers may vary depending on the product/system design. For example, the vehicle may have a controller for the engine 102, a controller for the MG inverter 106, a controller for the energy storage device 116, a controller for the traction motor inverter 110, and a higher level controller configured to systematically control interfaces with the aforementioned exemplary controllers. Throughout this description, reference will be made to "a controller." It should be understood that any combination of the components described herein may be implemented in whole or in part by "a controller."

The powertrain 100 may have a different layout from what is shown in FIG. 1. For example, hybrid powertrains can have parallel, series, and mixed series/parallel designs, all of which are collectively known as "power split architecture." In a parallel design as well as a mixed series/parallel design, the internal combustion engine provides power used to charge the battery and is also mechanically connected to the wheels of the vehicle to provide tractive power. In a series design (as shown in FIG. 1), the engine 102 is solely used for the purpose of powering the energy storage device 116 or the traction motor 112 by driving the MG 104 to generate power. The engine associated with the powertrain may be powered with diesel, gasoline, propane, natural gas, or solar energy. In some embodiments, the powertrain 100 uses a fuel cell that converts chemical energy of a fuel and an oxidizing agent into electricity through redox reactions, where the fuel is often hydrogen and the oxidizing agent is often oxygen.

As indicated above, the engine 102 may be any type of internal combustion engine such as a spark ignited engine powered by gasoline or a compression ignited engine powered by diesel. The MG 104 may be any suitable electricity-powered MG including AC brushless motors, DC brushed motors, DC brushless motors, direct drive rotary motors, linear motors, and so on, that can convert between electrical energy and mechanical energy.

The power generated by the engine 102 that drives the MG 104, gets converted first from mechanical energy to electrical energy via the MG 104, then from AC to DC via the MG inverter 106 and flows through the HV-DC junction box 108. In some instances, some of the power gets converted back to AC from DC via the traction motor inverter 110, and powers the traction motor 112. In some instances, some of the power flows from the HV-DC junction box 108 to the energy storage device 116 and is stored in the energy storage device 116. In some embodiments, the engine 102, the MG 104, the MG inverter 106, the HV-DC junction box 108, the traction motor inverter 110, the traction motor 112, and the energy storage device 116 are all coupled to the controller 118, and controlled by the controller 118.

The traction motor 112 is mechanically connected to the wheels 114 of the vehicle to propel/accelerate the vehicle. The traction motor 112 is controlled by the controller 118 and powered by the energy storage device 116. In some implementations, the energy storage device 116 is a high voltage battery.

The controller 118 is coupled to the engine 102 and the MG 104 to control operation of the engine 102 and the MG 104 during a trip such that a state-of-charge (SOC) of the energy storage device 116 tracks a dynamic target or reference SOC profile and an average engine power (AEP) is maintained above a threshold. In some instances, the SOC of the energy storage device 116 is a minimum allowable SOC at the end of the trip. The terms "target SOC profile" and "reference SOC profile" will be used interchangeably in this application, and should be understood as identical terms. In some embodiments, the controller 118 is configured to receive an engine start/stop frequency and to update a start/stop counter to maintain a number of engine starts/stops within a threshold value. In some embodiments, as will be discussed in further detail below, the controller 118 is configured to generate SOC reference profiles dynamically during a trip based on energy per mile estimations, and control the one or more components in the powertrain 100, so that the SOC of the energy storage device 116 tracks the generated SOC reference profiles.

Figure 2:
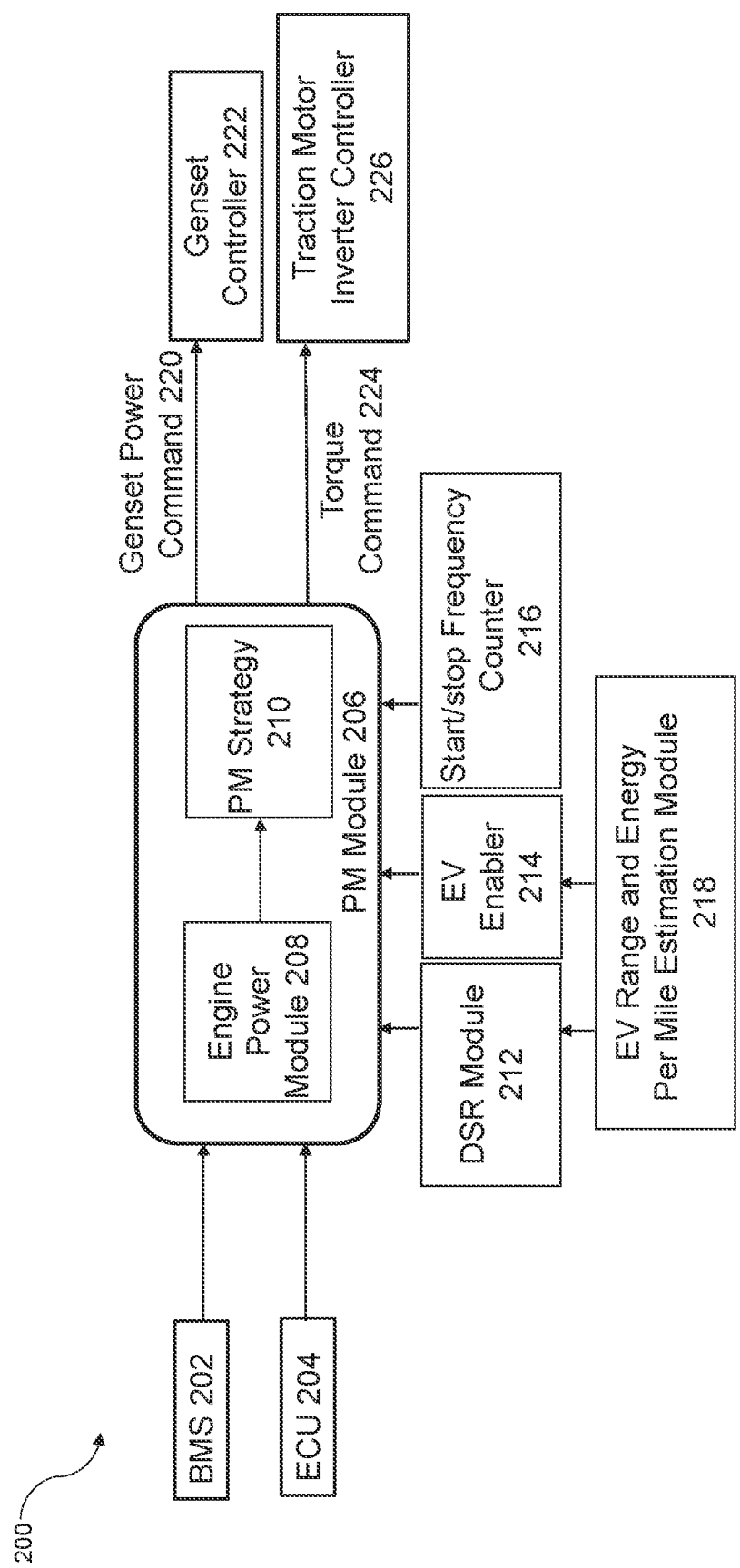
FIG. 2 is a block diagram of an example of a power management (PM) system, according to certain embodiments of the present disclosure.

FIG. 2 is a block diagram of an example of a power management (PM) system 200, according to certain embodiments of the present disclosure. The PM system 200 disclosed herein has numerous benefits. It addresses the key performance metrics of plug-in series hybrid electric vehicle: fuel economy, emissions, number of engine start/stops, and meeting battery power limits broadcasted from a battery management system. These metrics influence customer acceptance regarding fuel economy of the vehicle, meeting emissions regulations, and protecting powertrain components (e.g., the engine and battery). The PM system 200 also addresses the driver perception associated with engine noise by making sure that the engine is not run at high power/speed when the vehicle is at low speed by allowing setting of maximum engine power limits as a function of vehicle speed. By utilizing a metric of drive cycle available learned in real-time and/or from look-ahead information, the PM system 200 provides means for meeting in-use emissions requirements. The PM system 200 also minimizes the number of engine cold starts. Engine cold start is not only an issue from an emissions standpoint, but it also corresponds to deep thermal cycling, which impacts the life expectancy of various engine and aftertreatment components.

The PM system 200 may include a battery management system (BMS) 202, an engine control unit (ECU) 204, and a PM module 206. The BMS 202 may include or be in communication with one or more sensors to measure power limits and SOC of the energy storage device, and is configured to transfer the data measured to the PM module 206.

The ECU 204 may include or be in communication with one or more sensors and the cloud to measure one or more parameters (e.g., vehicle speed, wind speed, aftertreatment temperatures, oil temperature, power demand from a driver of the vehicle, etc.), and is configured to transfer the one or more parameters to the PM module 206. The one or more sensors coupled to the BMS 202 and ECU 204 may include different physical or virtual sensors, including sensors for SOC, catalyst temperature, turbine outlet temperature, vehicle speed, wind speed, battery internal resistance, battery open circuit voltage, battery full energy (i.e., total energy a battery can provide when fully charged), ambient air temperature, engine coolant temperature, air-fuel ratio, etc.

The PM module 206 includes an engine power module 208 and is configured to execute a PM strategy 210. In some embodiments, the engine power module 208 includes an engine power limit calculator configured to calculate engine power limits (i.e., the maximum and minimum engine power) so that battery power is guaranteed within the limits broadcasted in real time by BMS 202. In order to calculate the engine power limits, the engine power module 208 takes vehicle speed, driver demand power, traction motor efficiency, genset efficiency, inverters efficiency, battery power limits ($P_{batt\_limits}$), traction motor power ($P_{MG1}$), and engine power in a previous time step ($P_{engine}(k-1)$) into account. As battery power is an algebraic summation of engine power and traction motor power, the engine power needs to be within a limit in order to have battery power within a limit. $P_{engine}(k-1)$ is used to put a limit on engine power rate, based on which maximum and minimum engine power allowed may be calculated.

The engine power module 208 may also take into account engine states (e.g., oil temperature during startup, minimum engine on/off duration, cold start override, engine start requirements, etc.), engine power rate limit, and drivability of the vehicle. By putting a limit on the engine power rate for a spark-ignited engine, the transient level is decreased, which in turn has an effect on the performance of air-fuel ratio control, thus improving system out emissions.

In some implementations, the engine power module 208 calculates engine power via any of a variety of rule-based strategies known in the art. In some implementations, the engine power module 208 calculates engine power from the solution of an optimal control strategy such as with Pontryagin's Minimum Principle (PMP): Hamiltonian= f($P_{eng\_erect}$), where $P_{eng\_erect}$ is larger than or equal to $P_{eng\_min}(t)$, and $P_{eng\_vect}$ is less than or equal to $P_{eng\_max}(t)$. $P_{eng\_min}(t)$ and $P_{eng\_max}(t)$ are calculated by the engine power module 208 and updated in real-time. The PMP takes in account battery SOC dynamics, catalyst temperature dynamics, system out emissions based on an engine out emissions map and catalyst conversion efficiency model, engine fuel consumption maps, generator/inverter efficiency maps, and/or traction motor/inverter efficiency maps.

The PM strategy 210 determines engine power for optimizing fuel economy with constraints of system-out emissions and engine start/stops, while meeting battery power limits with consideration of vehicle drivability, and achieving a target battery SOC at the end of a trip. In some instances, the length of the trip is known at the beginning of the trip.

The PM system 200 may further include a dynamic SOC reference (DSR) module 212, an electric vehicle (EV) enabler 214, and a start/stop frequency counter 216. The DSR module 212 is configured to generate SOC reference values dynamically for the PM module 206, and the EV enabler 214 is configured to calculate EV range based on energy per mile (EPM) estimation, vehicle position in real time, trip distance, and look-ahead information. In some instances, the EV enabler is configured to enable or disable pure electric mode (also called "pure EV mode"), as will be described in further detail regarding FIG. 3A-3C.

The start/stop frequency counter 216 is configured to calculate the start/stop frequency of the engine. If the frequency of the engine start/stop exceeds a threshold, the PM module modifies the solution to guarantee the number of engine starts/stops remain within a limit, with consideration of deviation of SOC from SOC reference and aftertreatment temperature. The start/stop frequency counter 216 is a mechanism to protect engine components (e.g., bearings, starting systems, etc.) as an engine is designed to have a limit for starts/stops. Including the start/stop frequency counter 216 in the PM system 200 helps address issues such as engine aging or in-use emissions.

The PM system 200 may further include an EV range and energy per mile (EPM) estimation module 218. The EV range and EPM estimation module 218 is configured to estimate EV range left based on the SOC of the energy storage device 116 and vehicle position in real time. In some instances, the module 218 may calculate EV range and EPM estimation based on look-ahead information (e.g., traffic, speed, weather, maps, fleet information, etc.) for DSR module 212 and EV enabler 214 to make calculations/decisions accordingly. For example, calculated EPM of vehicles of a fleet that already transited a given area may be used to enhance the EPM estimation of vehicles that plan to enter the given area.

In some embodiments, the PM system 200 determines a final genset power command 220 based on calculations of the PM module 206 (e.g., engine power limits, etc.). In some instances, the PM module 206 operates a genset controller 222 based on the start/stop frequency of the engine to keep the start/stop frequency counter within the engine's limit.

In some embodiments, the PM system 200 determines a torque command 224 to transfer to a traction motor inverter controller 226. The torque command 224 is a final torque command that the PM system 200 desires the traction motor (shown as 112 in FIG. 1) to deliver. After being sent to the inverter controller 226, the inverter controller 226 will operate the inverter to achieve a motor torque as close as possible to the torque command 224.

FIGS. 3A-3F show diagrams of dynamic reference SOC profiles of an energy storage device 116 generated by a dynamic SOC reference (DSR) module 212 under different scenarios as a vehicle travels a certain distance, according to certain embodiments of the present disclosure. The powertrain 100 (e.g., the engine 102, the MG 104, the energy storage device 116, and the traction motor 112) may operate in a variety of different modes. In a blended mode, SOC of the energy storage device 116 may fluctuate but on average decreases. In a battery recharging mode, SOC of the energy storage device 116 may fluctuate but on average increases. In a charge sustaining mode, SOC of the energy storage device 116 may fluctuate but on average remains constant. In a pure EV mode, SOC of the energy storage device 116 decreases; energy provided to the traction motor 112 comes only from the energy storage device 116. In a blended mode, battery recharging mode, or a charge sustaining mode, energy provided to the traction motor 112 may come from the energy storage device 116, or from the engine 102 if the PM system 200 decides to turn on the engine 102.

Depending on different scenarios, such as different drive cycles or different ambient condition (e.g., ambient air temperature), the PM system 200 may generate SOC reference profiles accordingly to guarantee that during segments where the engine 116 is running, specifically during a blended mode (shown as segments 306, 312b), a charge sustaining mode (shown as segments 312c, 319f), or a battery recharging mode (shown as segments 320d, 320e, or 320f), AEP needed for the vehicle, including the battery, traction motor, and accessories, is higher than a threshold so that the aftertreatment system is not cold during blended, battery recharging, or charge sustaining mode. Cold aftertreatment temperatures results in higher tailpipe emissions of the vehicle.

Throughout the discussion of FIGS. 3A-3F, references are made to how the vehicle is operated during each segment. It should be understood that the figures are examples of reference SOC profiles generated by the controller 118 (or more specifically the DSR module 212), and the controller 118 is configured to control various components of the powertrain 100 so that SOC of the energy storage device 116 tracks the generated reference SOC profile in real time. The SOC reference profiles are generated dynamically by the DSR module 212.

As shown in FIG. 3A, data point 302a is the initial reference SOC at the beginning of the trip (0, $SOC_{init}$) and data point 304a is the final reference SOC at the end of the trip of a distance d (d, $SOC_{final}$). In FIG. 3A, which depicts an example of a blended mode SOC profile, the vehicle operates in a blended mode for the entire duration of the trip wherein the SOC of the energy storage device 116 depletes linearly with respect to vehicle position, as depicted by segment 306, to reach a final SOC at the end of the trip. In some embodiments (not shown in FIG. 3A), during segment 306, the vehicle may be operated in a blended mode wherein SOC of the energy storage device 116 decreases via a time-varying slope.

As shown in FIG. 3B, data points 302b and 304b are (0, $SOC_{init}$) and (d, $SOC_{final}$), respectively. Data point 308b ($d_{switch\_b}$, $SOC_{switch}$) defines a switch in the reference SOC profile between pure EV mode and a blended mode. During segment 310b defined by points 302b and 308b, the vehicle is operated in pure EV mode. During segment 312b defined by points 308b and 304b, the vehicle is operated in a blended mode wherein the SOC of the energy storage device 116 depletes linearly to reach a final SOC at the end of the trip. In some embodiments (not shown in FIG. 3B), during segment 312b, the vehicle may be operated in a blended mode wherein SOC of the energy storage device 116 decreases via a time-varying slope.

As shown in FIG. 3C, data points 302c and 304c are (0, $SOC_{init}$) and (d, $SOC_{final}$), respectively. Data point 308c ($d_{switch\_c}$, $SOC_{final}$) defines a switch between pure EV mode and a charge sustaining mode. During segment 310c defined by points 302c and 308c, the vehicle is operated in a pure EV mode. During segment 312c defined by points 308c and 304c, the vehicle is operated in a charge sustaining mode. As discussed above, in a charge sustaining mode, the SOC may fluctuate but is maintained at a certain level on average. In FIG. 3C, the SOC level in charge sustaining mode is $SOC_{final}$. In some embodiments (not shown in FIG. 3C), during segment 312c, the vehicle may be operated in a charge sustaining mode via a time-varying slope.

As shown in FIG. 3D, data points 302d and 304d are (0, $SOC_{init}$) and (d, $SOC_{final}$), respectively. Data points 314d and 316d are ($d_{1d}$, $SOC_{1d}$) and ($d_{1d}+d_{2d}$, $SOC_{2d}$), wherein $d=d_{1d}+d_{2d}+d_{3d}$. During segment 318d defined by points 302d and 314d, the vehicle is operated in a pure EV mode. During segment 320d defined by points 314d and 316d, the vehicle is operated in a battery recharging mode. As discussed above, in a battery recharging mode, the SOC may fluctuate but on average increases. In FIG. 3D, the SOC increases linearly with respect to vehicle position. During segment 322d defined by points 316d and 304d, the vehicle is switched back to operation in pure EV mode until the end of the trip.

As shown in FIG. 3E, data points 302e and 304e are (0, $SOC_{init}$) and (d, $SOC_{final}$), respectively. Data points 314e and 316e are (die, $SOC_{1e}$) and ($d_{1e}+d_{2e}$, $SOC_{2e}$), wherein $d=d_{1e}+d_{2e}+d_{3e}$. During segment 318e defined by points 302e and 314e, the vehicle is operated in a pure EV mode. During segment 320e defined by points 314e and 316e, and the trajectory between these two points, the vehicle is operated in a battery recharging mode wherein the SOC does not necessarily increase linearly with respect to vehicle position (i.e. via a constant slope) but may increase nonlinearly with respect to vehicle position (i.e. via a time-varying slope). During segment 322e defined by points 316e and 304e, the vehicle is switched back to operation in pure EV mode until the end of the trip. As shown, segment 320e has a time-varying slope, different from 320d which has a constant slope. In FIG. 3D, a constant slope of segment 320d is determined before engine is turned on at point 314d, whereas in FIG. 3C, the slope varies based on real-time EPM estimation during segment 320c. A constant slope requires some margin so that AEP is higher than the required threshold to account for the variation between past estimation before 314d and the future (e.g., segment 320d).

As shown in FIG. 3F, data points 302f and 304f are (0, $SOC_{init}$) and (d, $SOC_{final}$), respectively. Data points 314f, 316f and 317f are ($d_{1f}$, $SOC_{1f}$), ($d_{1f}+d_{2f}$, $SOC_{2f}$), and ($d_{1f}+d_{2f}+d_{3f}$, $SOC_{3f}$) wherein $d=d_{1f}+d_{2f}+d_{3f}+d_{4f}$. During segment 318f defined by points 302f and 314f, the vehicle is operated in a pure EV mode. During segment 320f defined by points 314f, 316f, and the trajectory between these two points, the vehicle is operated in a battery recharging mode wherein the SOC does not necessarily increase linearly with respect to vehicle position (i.e. via a constant slope) but may increase nonlinearly with respect to vehicle position (i.e. via a time-varying slope). During segment 319f defined by points 316f, 317f, and the trajectory between these two points, the vehicle is operated in a charge sustaining mode via time-varying slope. During segment 322f defined by points 317f and 304f, the vehicle is switched back to operation in pure EV mode until the end of the trip.

In some embodiments (not shown in FIG. 3F), during segment 319f, the vehicle may be operated in a blended mode wherein SOC of the energy storage device 116 decreases via a time-varying slope. In some embodiments (not shown in FIG. 3F), during segment 319f, the vehicle may be operated in a blended mode wherein SOC of the energy storage device 116 decreases via a constant slope. In some embodiments (not shown in FIG. 3F), during segment 320f, the vehicle may be operated in a battery recharging mode wherein SOC of the energy storage device 116 increases via a constant slope.

DSR module 212 guarantees the following requirements when generating SOC target or reference profiles.

1) AEP is higher than a threshold to not have cold starts during blended mode (i.e., segments 306, 312b), charge sustaining mode (i.e. segment 312c), battery recharging mode (i.e., segment 320d, 320e, and 320f), and either charge sustaining mode or blended mode (i.e., segment 319f), except for the allowable first engine start during the trip;

2) point 314 has SOC not lower than the minimum allowable SOC of the energy storage device;

3) point 316 and point 317f have SOC not higher than the maximum allowable SOC of the energy storage device; and 4) summation of the distances of segments $d_{1d}+d_{2d}+d_{3d}$, $d_{1e}+d_{2e}+d_{3e}$, and $d_{1f}+d_{2f}+d_{3f}+d_{3f}$ are equal to the distance of the trip.

Note that FIG. 3D is a general case which may become FIG. 3A or FIG. 3B depending on the distance of the trip and other variables involved in the calculation. For example, if point $314d=302d$ and point $316d=304d$, FIG. 3D becomes the equivalent of FIG. 3A. Similarly, if point $316d=304d$, FIG. 3D becomes the equivalent of FIG. 3B. Similarly, FIG. 3B may become FIG. 3C if $SOC_{switch}=SOC_{final}$. FIG. 3E may become the equivalent of FIG. 3D if the DSR module 212 calculates in real time, and determines that the slope during segment 320e remains constant. FIG. 3F may become the equivalent of FIG. 3E if the distance $d_{3f}=0$ (i.e., $316f=317f$), and therefore have $d_{4f}$ becomes the equivalent of die in FIG. 3E. The PM system 200 may determine which SOC target/reference profile to use as long as the four requirements are met. For example, if AEP is higher than the threshold during blended mode 306 in FIG. 3A, then the SOC target/reference profile in FIG. 3A may be used, because the other requirements are met with FIG. 3A.

The DSR module 212 and EV enabler 214 allow the engine to operate if the PM system 200 decides to turn on the engine 102. During segments of a trip when the engine is running, DSR module 212 aims to maintain the average engine power (AEP) above a threshold to enable or maintain high emissions reduction resulting from aftertreatment temperature management. If the AEP is lower than the threshold, the exhaust enthalpy and exotherm from reactions in aftertreatment are not sufficient to maintain a high enough aftertreatment temperature. Since the engine energy depends on drive cycle and SOC reference, SOC reference may be dynamically generated based on EPM (i.e., energy needed for the traction motor and other loads (e.g. accessories) to propel the vehicle for one mile) estimation in real time. As discussed above, EPM may be estimated by EPM estimation module 218 in real time based on look-ahead information.

DSR module 212 and EV enabler 214 are configured to calculate distances $d_1$ and $d_2$ (corresponding to $d_{1d}$ and $d_{2d}$ in FIG. 3D, die and the in FIG. 3E, and $d_{1f}$ and $d_{2f}$ in FIG. 3F). For example, with $SOC_{final} \leq SOC_1 \leq SOC_{max}$, $SOC_{final} \leq SOC_2 \leq SOC_{max}$, $SOE_{final} \leq SOE_1 \leq SOE_{max}$, and $SOE_{final} \leq SOE_2 \leq SOE_{max}$, the following equations may be used to determine distances $d_1$ and $d_2$, where $Cap_{batt}$ is the battery full energy (kWh), SOE is the battery state of energy—ratio of battery remaining energy and maximum available energy, and $Energy_{eng}$ is the engine energy, which is the energy engine 102 provides for the vehicle during the trip.

$$EPM*d_1 = Cap_{batt}*(SOE_{init} - SOE_1) \quad \quad 1)$$

$$EPM*d_2 + Cap_{batt}*(SOE_2 - SOE_1) = Energy_{eng} \quad \quad 2)$$

$$EPM*d_3 = Cap_{batt}*(SOE_2 - SOE_{final}) \quad \quad 3)$$

$$EPM*d = Cap_{batt}*(SOE_{init} - SOE_{final}) + Energy_{eng} \quad \quad 4)$$

In order for the engine to deliver sufficient energy to catalysts for emission control, the AEP needs to be maintained above a certain threshold $\overline{P}_{min}$ during engine-running segments as discussed above.

$$\begin{cases} \dfrac{Energy_{eng}}{t_2} \geq \overline{P}_{min} \Rightarrow \dfrac{Energy_{eng}}{d_2}\overline{v}_2 \geq \overline{P}_{min} \Rightarrow \dfrac{EPMd_2 + Cap_{batt}(SOE_2 - SOE_1)}{d_2}\overline{v}_2 \geq \overline{P}_{min} \Rightarrow \dfrac{SOE_2 - SOE_1}{d_2} \geq \dfrac{\dfrac{\overline{P}_{min}}{\overline{v}_2} - EPM}{Cap_{batt}} \\ d_2 = \dfrac{EPMd - Cap_{batt}(SOE_{init} - SOE_{final})}{EPM + Cap_{batt}R} \text{ where } R = \dfrac{SOE_2 - SOE_1}{d_2} \Rightarrow SOE_1 = SOE_2 - Rd_2 \leq SOE_{max} - Rd_2 \end{cases}$$

$$\Leftrightarrow \begin{cases} R \geq \dfrac{\dfrac{\overline{P}_{min}}{\overline{v}_2} - EPM}{Cap_{batt}} \\ d_2 = \dfrac{EPMd - Cap_{batt}(SOE_{init} - SOE_{final})}{EPM + Cap_{batt}R} \\ SOE_1 = SOE_2 - Rd_2 \leq SOE_{max} - Rd_2 \end{cases}$$

where $t_2$ is the time duration during which vehicle travels the distance $d_2$ and $\overline{v}_2$ is averaged vehicle speed during the distance $d_2$. While these energy conservation equations are with SOE, the target/reference profile DSR module 212 generates is SOC. Therefore, some approximation of SOC based on SOE can be used. The simplest approximation is SOE=SOC and provide some margin in calibration to achieve an AEP higher than the threshold practically. The approximated equations become $$\begin{cases} R = \dfrac{SOC_2 - SOC_1}{d_2} \geq \dfrac{\dfrac{\overline{P}_{min}}{\overline{v}_2} - EPM}{Cap_{batt}} \\ d_2 = \dfrac{EPMd - Cap_{batt}(SOC_{init} - SOC_{final})}{EPM + Cap_{batt}R} \\ SOC_1 = SOC_2 - Rd_2 \leq SOC_{max} - Rd_2 \end{cases}$$

As shown by the above equations, the rate of SOC changes during engine running R must be above a number, which depends on EPM. If EPM is low during R, then rate of SOC change is high. If EPM is high enough, $SOC_2$ may be smaller than $SOC_1$. After calculating $d_2$ based on the rate limit R, $SOC_2$ is guaranteed to have an upper limit ($SOC_{max}$), and the battery is not charged above $SOC_{max}$ during the engine running duration. In some instances, $SOC_1$ may be calculated with the equation $SOC_1 = SOC_{max} - Rd_2$. As R gets larger, $Rd_2$ also gets larger, which can lead to $SOC_1$ being lower than $SOC_{min}$. Therefore, R is limited by an upper limit so that $SOC_{max} - Rd_2 \geq SOC_{min}$. In some instances, this means $SOC_{max} - Rd_2 \geq SOC_{final}$.

In some instances, depending on the distance of a trip, more than one cold start may happen (such as in FIGS. 3D-3F), thus increasing emissions. In order to reduce the chance of having more than one cold start, AEP threshold may be decreased in parts of or full distances of segments 320d and 320e (distances $d_{2d}$ and $d_{2e}$) using any acceptable strategy, such as retarding spark timing for spark-ignited engines, maximizing wastegate opening, less/no engine shut-down between $SOC_1$ and $SOC_2$, maximizing other vehicle load consumptions (e.g., accessories) if allowed (increase EPM intentionally), thus elongating the distance $d_2$ (shown as $d_{2d}$ and $d_{2e}$ the in FIGS. 3D and 3E, respectively). By making distance $d_2$ longer, the engine operates at a lower fuel economy, but the average exhaust enthalpy over time is sufficient to make tailpipe emissions lower.

In some embodiments, in order to avoid having more than one cold start, an SOC target/reference profile as in FIG. 3F can be used. As shown, both segments 320f and 319f have time-varying slopes. Segment 319f in FIG. 3F is used because before 317f, battery does not have enough energy to finish the rest of the trip in pure EV mode while battery has a maximum allowable SOC and SOC cannot keep increasing with the slope as in segment 320f when it reached the maximum allowable SOC.

In segment 319f, engine is operated in a special way such as by retarding spark timing for spark-ignited engine, maximizing wastegate opening, less/no engine shut-down (starts/stops) in segment 319f, maximizing other vehicle load consumptions (e.g., accessories) if allowed (increase EPM intentionally). Therefore, in segment 319f, SOC target/reference profile may have less steep of a slope, on average, compared to segment 320f, but still maintain an aftertreatment temperature to avoid a second cold start. This is achieved by having a higher EPM and/or a lower required AEP threshold of engine through some special engine operations. As shown, segment 320f has a time-varying slope. In some embodiments, segment 320f may have a constant slope. In some embodiments, segment 319f may also have a constant slope.

In some embodiments, AEP threshold of engine is not a constant but a function dependent on various conditions, including but not limited to vehicle speed, wind speed, ambient air temperature, and aftertreatment temperatures, all of which may impact heat transfer from the aftertreatment system. AEP is one of the factors that impact aftertreatment temperature, which depends on exhaust enthalpy from engine, exhaust flow species, and heat loss to the environment. A virtual sensor of bulk heat transfer and bulk heat transfer coefficient to ambient can be used to estimate the rate of heat transfer to ambient. An adjusted AEP threshold can be calculated as $\overline{P}_{min} = \overline{P}_{min,nominal} - \dot{Q}_{nominal} + \dot{Q}_{estimate}$, where $\dot{Q}_{nominal}$ is the estimated rate of bulk heat transfer from the aftertreatment system to ambient in nominal condition, $\overline{P}_{min\_nominal}$ is calibrated/obtained in nominal conditions so as to not have a second cold start during blended/battery recharging/charge sustaining segments such as 306, 312, 320, or 319f, and $\dot{Q}_{estimate}$ is the estimated rate of bulk heat transfer from the aftertreatment system to ambient in real-world conditions.

Figure 4:
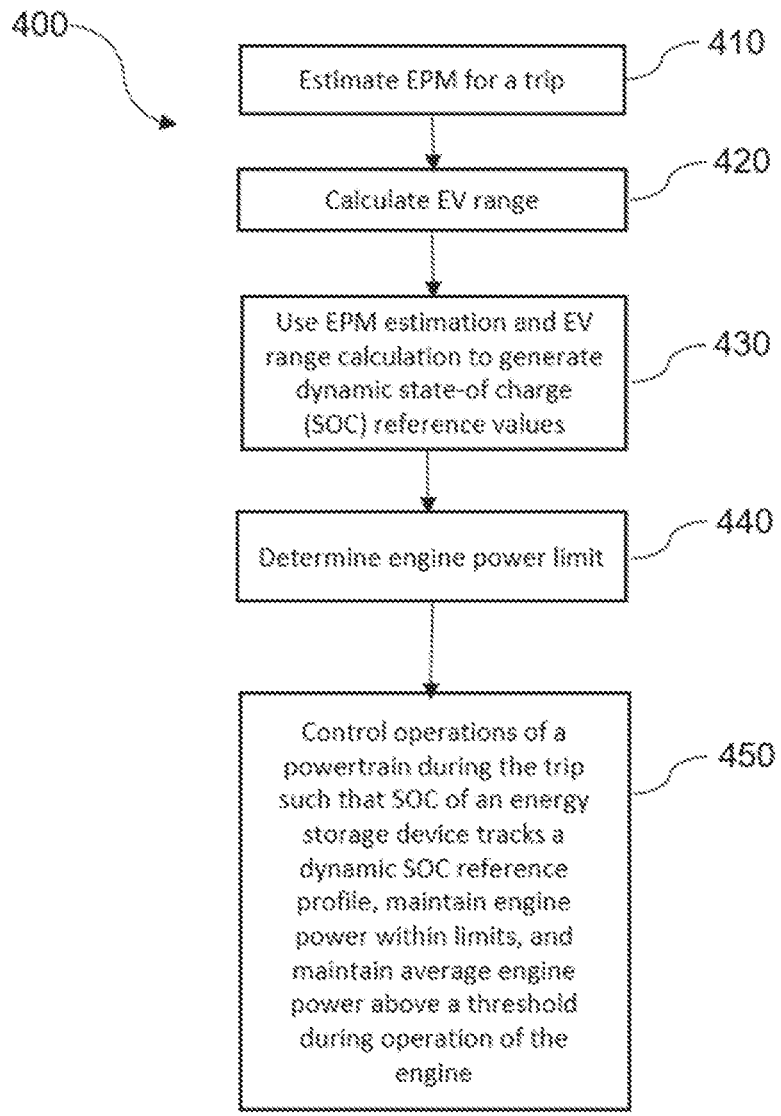
FIG. 4 is a flow chart describing a method for controlling a plug-in series hybrid electric vehicle, according to certain embodiments of the present disclosure.

FIG. 4 is a flow chart describing a method 400 for controlling a plug-in series hybrid electric vehicle, according to certain embodiments of the present disclosure. In block 410, EPM for a trip is estimated. In block 420, the EV range for a trip is calculated. If a length of a trip is shorter than the EV range, the vehicle may be operated in EV only without turning on the engine. As described above, the EV range and EPM estimation are calculated by the PM system 200, specifically the EV range and EPM estimation module 218. The EV range and EPM estimation module 218 is configured to estimate EV range left based on the SOC of the energy storage device, vehicle position in real time, and look-ahead information (e.g., traffic, speed, weather, maps, etc.).

In block 430, EPM estimation and EV range calculation are used to generate DSR values. As discussed above, the DSR values are generated by the DSR module 212 which aims to maintain the average engine power (AEP) above a threshold to reduce emissions. The DSR module 212 is configured to generate SOC reference dynamically based on EPM estimation in real time.

In block 440, engine power limits are determined. As discussed above, the engine power limits (i.e., the maximum and minimum engine power) are calculated by an engine power module 208 so that battery power is guaranteed to remain within the limits provided by BMS 202 from a static standpoint. In order to calculate the engine power limits, the engine power module 208 takes vehicle speed, driver demand power, traction motor efficiency, genset efficiency, inverters efficiency, engine power rate limits, aftertreatment condition, and battery power limits ($P_{batt\_limits}$) into account.

In block 450, engine 102 and MG 104 (collectively the engine/MG) operations are controlled by a controller during the trip to have SOC of an energy storage device track the dynamic SOC reference profile. The engine operation is controlled by the controller during the trip to remain within engine power limits using the DSR values, and the AEP is maintained above a threshold.

Unless specified, the steps listed in FIG. 4 should not be interpreted as implying any requirement of, or specific order among or between, various steps disclosed herein. One or more steps of method 400 are optional and/or can be modified by one or more steps of other embodiments described herein. Additionally, one or more steps of other embodiments described herein may be added to method 400. For example, the method 400 may include calculating start/stop frequency and updating a start/stop counter to maintain a number of engine start/stops within a threshold value.

Embodiments of the present disclosure are described by way of example only, with reference to the accompanying drawings. Further, the following description is merely illustrative in nature and is in no way intended to limit the disclosure, its application, or uses. As used herein, the term "unit" or "module" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

We claim:
1. A plug-in series hybrid electric vehicle, comprising:
an engine;
a motor/generator (MG) coupled to the engine;
a traction motor coupled to the MG and configured to propel the vehicle;
an energy storage device coupled to the MG; and
a controller coupled to the engine and the MG to control operation of the engine and the MG such that a state-of-charge (SOC) of the energy storage device tracks a dynamic reference SOC profile during a trip and an average engine power (AEP) is maintained above a threshold power value, wherein the controller main- tains an aftertreatment temperature associated with the engine above a threshold temperature during operation of the engine.

2. The vehicle of claim 1, wherein the engine is spark ignited and the energy storage device is a high voltage battery.

3. The vehicle of claim 1, wherein the SOC of the energy storage device is a minimum allowable SOC at the end of the trip.

4. The vehicle of claim 1, wherein the controller comprises:
an electric vehicle (EV) enabler configured to enable or disable pure electric mode;
a battery management system (BMS) configured to measure the SOC of the energy storage device; and
a dynamic SOC reference (DSR) module configured to generate SOC reference dynamically.

5. The vehicle of claim 4, wherein the controller, including the EV enabler, is configured to calculate EV range based on energy per mile (EPM) estimation, vehicle position in real time, trip distance, and look-ahead information.

6. The vehicle of claim 5, wherein the look-ahead information comprises traffic, speed, fleet information, and weather.

7. The vehicle of claim 4, wherein the controller further comprises:
a frequency counter configured to calculate a start/stop frequency of an engine; and
an engine power module configured to calculate engine power limits.

8. The vehicle of claim 7, wherein the controller is configured to receive the start/stop frequency and to update a start/stop counter to maintain a number of engine start/stops within a threshold value.

9. The vehicle of claim 7, wherein the engine power limits are based on at least one of a driver demand power, traction motor efficiency, inverters efficiency, and battery power limits.

10. The vehicle of claim 7, wherein the engine power module comprises one or more sensors to detect at least one of a catalyst temperature, a turbine outlet temperature, vehicle speed, ambient temperature, battery internal resistance, battery open circuit voltage, battery full energy, engine coolant temperature, air-fuel ratio.

11. A method for controlling a plug-in series hybrid electric vehicle, comprising:
controlling operation of a powertrain during a trip such that a state-of-charge (SOC) of an energy storage device tracks a dynamic SOC reference profile; and
controlling operation of the powertrain to maintain an average engine power (AEP) above a threshold power value to maintain an aftertreatment temperature associated with the engine above a threshold temperature during operation of the engine.

12. The method of claim 11, further including estimating a total energy required from the engine for a trip.

13. The method of claim 12, wherein estimating a total energy required from the engine includes determining a duration of the trip and estimating an energy per mile (EPM) for a vehicle during the trip.

14. The method of claim 12, further including dynamically generating a reference SOC of the energy storage device.

15. The method of claim 11, wherein the SOC of the energy storage device is a minimum allowable SOC at the end of the trip.

16. The method of claim 11, further including:
calculating start/stop frequency; and
updating a start/stop counter to maintain a number of engine start/stops within a threshold value.

17. The method of claim 12, further including calculating engine power limits.

18. The method of claim 17, wherein the engine power limits are calculated based on at least one of a driver demand power, traction motor efficiency, inverters efficiency, and battery limits.

19. A power management system for a plug-in series hybrid electric vehicle, comprising:
a controller/processor including a memory;
wherein the memory includes instructions;
wherein the controller/processor is configured to execute the instructions to control operation of a motor/generator (MG) powered by an energy storage device during a trip such that a state-of-charge (SOC) of the energy storage device tracks a dynamic SOC reference profile; and
wherein the controller/processor is configured to execute the instructions to control operation of an engine to maintain an average engine power (AEP) above a threshold power value to maintain an aftertreatment temperature associated with the engine above a threshold temperature during operation of the engine.

20. The power management system of claim 19, wherein a length of the trip is known at a beginning of the trip.

21. The vehicle of claim 1, wherein the threshold power value is determined using at least one of vehicle speed, wind speed, or ambient air temperature.

22. The method of claim 11, wherein the threshold power value is determined using at least one of vehicle speed, wind speed, or ambient air temperature.

23. The vehicle of claim 1, wherein the dynamic reference SOC profile comprises a segment comprising a blended mode.

24. The vehicle of claim 1, wherein the dynamic reference SOC profile comprises one or more segments comprising a blended mode and a pure EV mode.

25. The vehicle of claim 1, wherein the dynamic reference SOC profile comprises one or more segments comprising a pure EV mode and a charge sustaining mode.

26. The vehicle of claim 1, wherein the dynamic reference SOC profile comprises one or more segments comprising a pure EV mode and a battery recharging mode.

27. The vehicle of claim 1, wherein the dynamic reference SOC profile comprises one or more segments comprising a pure EV mode, a battery recharging mode, and a battery sustaining mode.

28. The vehicle of claim 1, wherein the dynamic reference SOC profile comprises one or more segments comprising a pure EV mode, a battery recharging mode, and a blended mode.

* * * * *